(12) United States Patent
Bajenaru et al.

(10) Patent No.: US 9,047,069 B2
(45) Date of Patent: Jun. 2, 2015

(54) COMPUTER IMPLEMENTED METHOD OF ELECTING K EXTREME ENTRIES FROM A LIST USING SEPARATE SECTION COMPARISONS

(75) Inventors: Constantin Bajenaru, Brookline, NH (US); Michael Livshitz, Rockville, MD (US); Mingjian Yan, Gaithersburg, MD (US); Jing Jiang, Wellesley, MA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 654 days.

(21) Appl. No.: 13/445,728

(22) Filed: Apr. 12, 2012

(65) Prior Publication Data
US 2013/0007419 A1 Jan. 3, 2013

Related U.S. Application Data

(60) Provisional application No. 61/474,465, filed on Apr. 12, 2011.

(51) Int. Cl.
| | | |
|---|---|---|
| *G06F 15/00* | (2006.01) | |
| *G06F 15/76* | (2006.01) | |
| *G06F 7/24* | (2006.01) | |
| *G06F 9/30* | (2006.01) | |

(52) U.S. Cl.
CPC .............. *G06F 7/24* (2013.01); *G06F 9/30014* (2013.01); *G06F 9/30018* (2013.01); *G06F 9/30021* (2013.01); *G06F 9/30036* (2013.01)

(58) Field of Classification Search
None
See application file for complete search history.

(56) References Cited

U.S. PATENT DOCUMENTS

| 5,218,700 | A | * | 6/1993 | Beechick ...................... 712/300 |
|---|---|---|---|---|
| 6,366,911 | B1 | * | 4/2002 | Christy ........................ 707/737 |
| 2007/0016558 | A1 | * | 1/2007 | Bestgen et al. .................. 707/3 |
| 2009/0076862 | A1 | * | 3/2009 | Patoureaux et al. ............. 705/5 |
| 2011/0161273 | A1 | * | 6/2011 | Nakayama et al. ............. 706/47 |

OTHER PUBLICATIONS

Martinez (Partial Quicksort, 2004, pp. 1-5).*
Akbarinia et al. (Best Position Algorithm for Top-k Queries, Sep. 2007, pp. 495-506).*

* cited by examiner

*Primary Examiner* — George Giroux
(74) *Attorney, Agent, or Firm* — Robert D. Marshall, Jr.; Frank D. Cimino

(57) ABSTRACT

A computer implemented method selects K extreme elements of a list of N elements by partitioning each of the N elements into a plurality of sections. For each section the method selects a threshold selection determining at least K extreme entries from the list. This iteratively compares a corresponding section to a section threshold, counts a number of sections which are more extreme than the section threshold, increasing (or decreasing) the section threshold if the count is greater than K and decreasing (or increasing) the section threshold if the count is less than K. The method forms a combined threshold by concatenation of said section thresholds in order, compares each of the N elements to the combined threshold, and selects at least K elements from the set of N elements more extreme than the combined threshold.

26 Claims, 10 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

| Word/Sec 03 | Word/Sec 02 | Word/Sec 01 | Word/Sec 00 |
|---|---|---|---|
| Word/Sec 13 | Word/Sec 12 | Word/Sec 11 | Word/Sec 10 |
| Word/Sec 23 | Word/Sec 22 | Word/Sec 21 | Word/Sec 20 |
| ⋮ | ⋮ | ⋮ | ⋮ |
| Word/Sec X3 | Word/Sec X2 | Word/Sec X1 | Word/Sec X0 |
| ⋮ | ⋮ | ⋮ | ⋮ |
| Word/Sec N3 | Word/Sec N2 | Word/Sec N1 | Word/Sec N0 |

*FIG. 5*

| | | | |
|---|---|---|---|
| Word/Sec 33 | Word/Sec 23 | Word/Sec 13 | Word/Sec 03 |
| Word/Sec 73 | Word/Sec 63 | Word/Sec 53 | Word/Sec 43 |
| ⋮ | ⋮ | ⋮ | ⋮ |
| Word/Sec 32 | Word/Sec 22 | Word/Sec 12 | Word/Sec 02 |
| Word/Sec 72 | Word/Sec 62 | Word/Sec 52 | Word/Sec 42 |
| ⋮ | ⋮ | ⋮ | ⋮ |
| Word/Sec 31 | Word/Sec 21 | Word/Sec 11 | Word/Sec 01 |
| Word/Sec 71 | Word/Sec 61 | Word/Sec 51 | Word/Sec 41 |
| ⋮ | ⋮ | ⋮ | ⋮ |
| Word/Sec 30 | Word/Sec 20 | Word/Sec 10 | Word/Sec 00 |
| Word/Sec 70 | Word/Sec 60 | Word/Sec 50 | Word/Sec 40 |
| ⋮ | ⋮ | ⋮ | ⋮ |

601 — Word/Sec 73 row
602 — Word/Sec 72 row
603 — Word/Sec 71 row
604 — Word/Sec 70 row

*FIG. 6*

COMPUTER IMPLEMENTED METHOD OF ELECTING K EXTREME ENTRIES FROM A LIST USING SEPARATE SECTION COMPARISONS

CLAIM OF PRIORITY

This application claims priority under 35 U.S.C. 119(e)(1) to U.S. Provisional Application No. 61/474,465 filed Apr. 12, 2011.

TECHNICAL FIELD OF THE INVENTION

The technical field of this invention is list selection algorithms.

BACKGROUND OF THE INVENTION

Many computing applications require selection of the K greatest (or least) numbers from a list of length N. One known method to achieve this result is to completely sort the element of the N length list and then select the K greatest (or least) as indicated by a sorted list. This process requires much data manipulation in the initial sort. It can be clearly seen that much of this sorting is wasted because for elements falling outside the K greatest (or least) elements the sorting does not contribute to the selection.

SUMMARY OF THE INVENTION

A computer implemented method selects K greatest (or least) elements of a list of N elements. This method includes partitioning each of the N elements into a plurality of sections. For each section from a most significant section to a least significant section, the method selects a threshold selecting at least K greatest (or least) entries from the list. This iteratively compares a corresponding section of each of the N elements to a section threshold, counts a number of sections of the N elements which are not less (or greater) than the section threshold, increasing (or decreasing) the section threshold if the count is greater than K and decreasing (or increasing) the section threshold if the count is less than K.

After finding the section threshold for the corresponding section the method forms a combined threshold by concatenation of said section thresholds in order from a most significant section to a least significant section, compares each of the N elements to the combined threshold, and selects K elements from the set of N elements not less (or greater) than the combined threshold.

The threshold determination set an initial section threshold to a number one half of a maximum number expressible by the number of bits of the corresponding section. An initial adjustment is set to half this initial section threshold. Generally, the threshold is increased by adding the current threshold and the current adjustment and decreased by subtracting the current adjustment from the current threshold. The adjustment is halved for the next section threshold determination.

The computer implemented method preferably employs a multiple compare instruction, a bit count instruction, a multiple addition instruction and a mask instruction.

In the preferred embodiment this is a byte-based selection applied toward the conventional problem of selecting K greatest (or least) entries out of N. The goal is to produce highly MIPS (Millions of Instructions per Second) efficient code by leveraging the Single Instruction Multiple Data (SIMD) strength of TI TMS320C6600 family of digital signal processors, or the instructional level parallelism of any processing architecture. The computational efficiency is achieved through decoupling data entries into separate byte arrays for processing and through parallel implementations at instructional level in array processing.

BRIEF DESCRIPTION OF THE DRAWINGS

These and other aspects of this invention are illustrated in the drawings, in which:

FIG. 5 illustrates the division of the list entries into sections of this invention;

FIG. 6 illustrates the interleaving of sections according to a preferred embodiment of this invention;

DETAILED DESCRIPTION OF PREFERRED EMBODIMENTS

Figure 1:
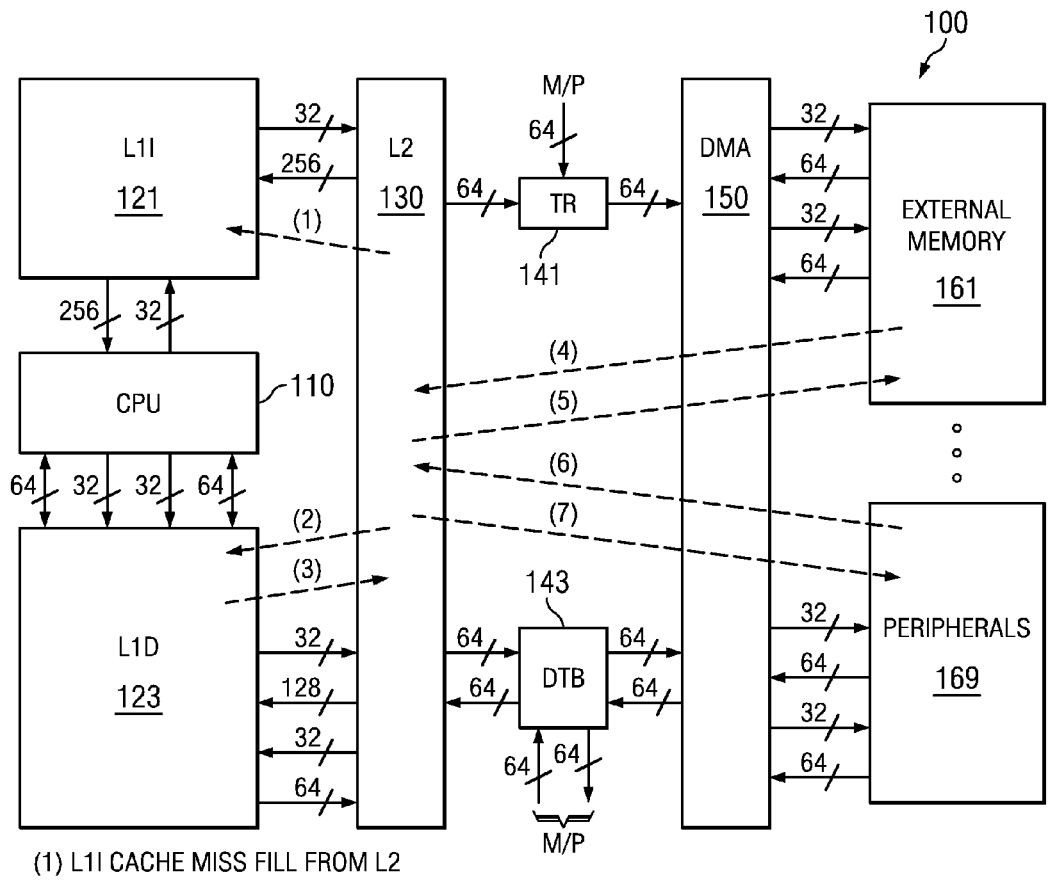
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit (CPU) core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

FIG. 1 illustrates several data/instruction movements within the digital signal processor system 100. These include: (1) instructions move from L2 cache 130 to L1I cache 121 to fill in response to a L1I cache miss; (2) data moves from L2 cache 130 to L1D cache 123 to fill in response to a L1D cache miss; (3) data moves from L1D cache 123 to L2 cache 130 in response to a write miss in L1D cache 123, in response to a L1D cache 123 victim eviction and in response to a snoop from L2 cache 130; (4) data moves from external memory 161 to L2 cache 130 to fill in response to L2 cache miss or a direct memory access (DMA) data transfer into L2 cache 130; (5) data moves from L2 cache 130 to external memory 161 in response to a L2 cache victim eviction or writeback and in response to a DMA transfer out of L2 cache 130; (6) data moves from peripherals 169 to L2 cache 130 in response to a DMA transfer into L2 cache 130; and (7) data moves from L2 cache 130 to peripherals 169 is response to a DMA transfer out of L2 cache 130.

Figure 2:
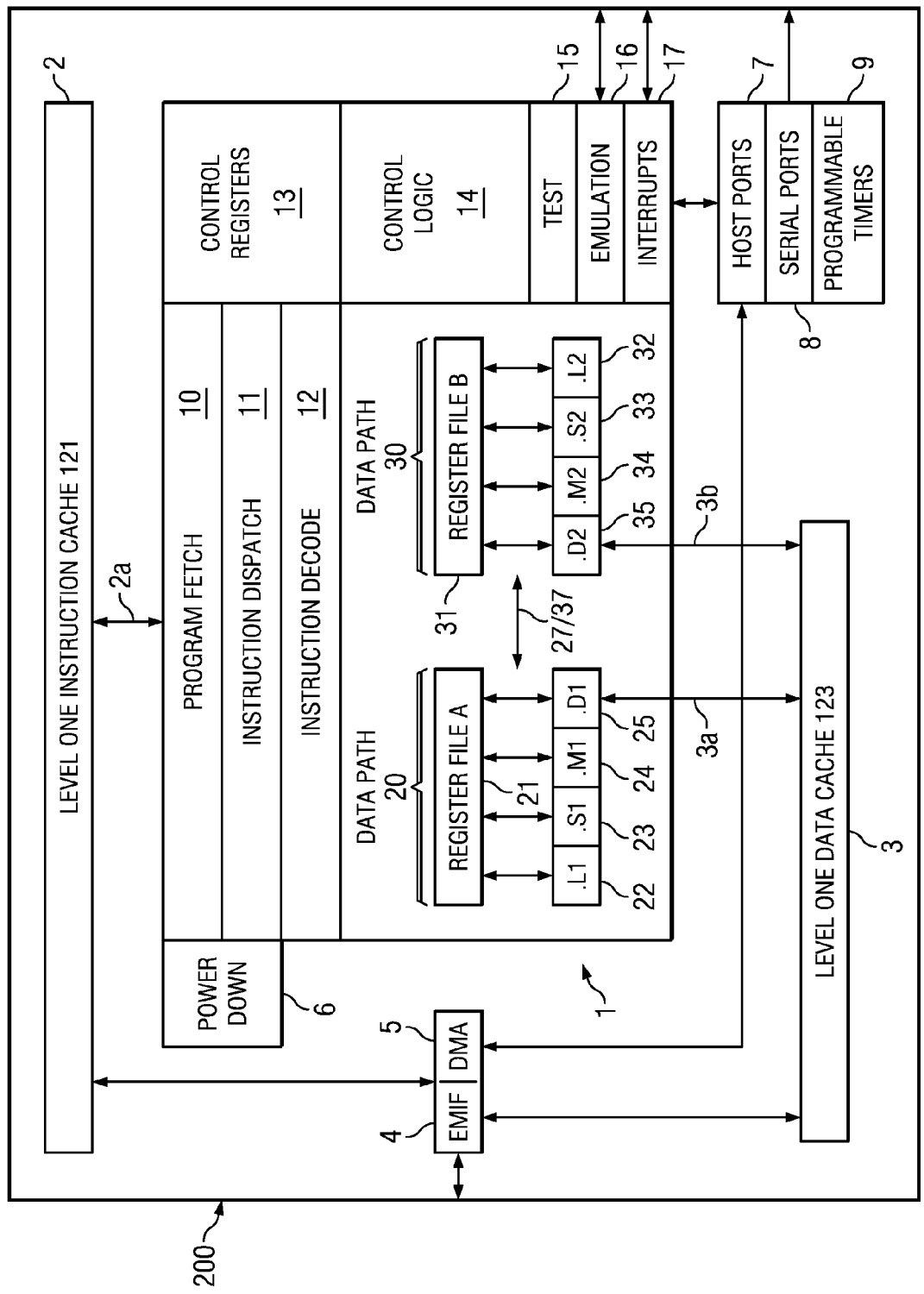
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level one instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs simultaneously in each of the two data paths 20 and 30. As previously described each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
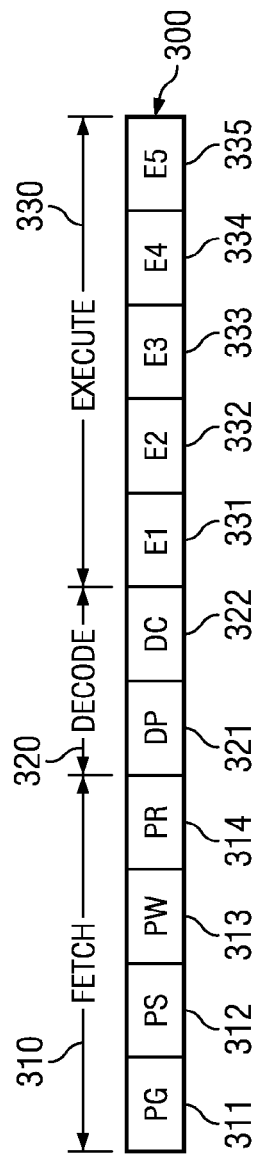
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

Figure 4:
FIG. 4 illustrates the instruction syntax of the very long instruction word digital signal processor core illustrated in FIG. 2 (prior art)

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

This invention determines the K greatest (or least) entries in a list of numbers of length N. This invention assumes that the list of numbers is initially stored in consecutive memory locations whose locations are known. In accordance with this invention the list of N entries may be in any order and may include duplicate values. In addition the number of bits of these entries is not required to be the same as the data size of the memory. If entries are fewer bits than the data size of the memory, then each entry is right justified and the most significant bits are zero filled to the data size of the memory.

FIG. 5 illustrates this disposition of the list in memory. The list includes N+1 data words Word 0 through Word N. As shown in FIG. 5 each of the words Word 0 through Word N is partitioned into four sections. Word 0 includes section 03, section 02, section 01 and section 00. Word 1 includes section 13, section 12, section 11 and section 10. Word 2 includes section 23, section 22, section 21 and section 20. Word N includes section N3, section N2, section N1 and section N0. In accordance with the convention of FIG. 5 sections X3 includes the most significant bits and section X0 includes the least significant bits of the corresponding Word X.

The key to reduce needed operations in this application is to decouple the selection into separate processing of sections of each entry. In accordance with this invention each of the N words is partitioned into a number of sections. These can be 8 individual byte sections of a double word (64 bits) or 4 individual byte sections of a word (32 bits). This invention is applicable to variable sized sections. However in accordance with known computer construction the data words generally have an integral power of 2 number of bits, for example 16, 32 or 64 bits. The sections would typically be of equal size and also have an integral power of 2 bits, such as 4, 8 or 16 bits.

This description will be of an example of 32 bit data words partitioned into 4 8-bit (1 byte) sections. This selection is merely a convenience for description.

There are two steps in the greatest (or least) K selection: threshold search; and key/index selection. The preferred embodiment of the threshold search considers the list one section at a time starting with the most significant byte array. For each section of the list, the threshold search compares the corresponding section of each entry with a adaptable threshold. The threshold adapted via a binary search until it reaches the threshold value having at least K section values not less (or greater) than it. If the search finds a threshold value with exactly K section values not less (or greater) than the threshold, the search step ends. Otherwise the threshold search proceeds to the next section of the list. Each section searches for a separate section threshold only over those entries which the immediately previous section found were not less (or greater) than the corresponding section threshold. Other than this, each section search is independent of all previous searches. The threshold search does not depend upon prior sections in that each section is searched for a section threshold independent of all prior section thresholds. Without the knowledge of any prior section thresholds, each section search attempts to ensure that at least K values remain. The plural section threshold searches enable production of a whole word threshold by concatenation in significant bit order.

The second part of the algorithm selects the greatest (or least) K candidates. This selection uses the concatenated section thresholds to identify the candidates by comparing the concatenated thresholds with each word entry in the original list. Because each section search found at least K candidates and each section search is independent, it is possible that this final selection search initially selects more than K candidates. This can also occur when the K−1-th and the K-th greatest entries in the original list are identical. In some cases more than two identical entries occur at this boundary. This situation is handled via a special case as will be explained below.

To leverage efficient parallel memory access, the input data entries should be interleaved to be decoupled into multiple byte arrays residing in continuous memory. In this decoupling process, efficient array processing is achieved through packed data access by using SIMD intrinsics such as dpackl2, dpackh2, dpackl4, dpackh4 for multi-byte packing, along with amem8 and hill and loll for multi-byte memory access and extraction. In real systems, hardware acceleration, such as the use of extended direct memory access (EDMA) data transfers can be employed to reduce consumption of CPU cycles during this interleaving.

FIG. 6 illustrates the result of this interleaving. The data in memory includes four data portions 601, 602, 603 and 604. Each data portion includes packed data words each having the corresponding sections. Data portion 601 includes all the (highest significant) bytes 3 arranged in sequential words. Data portion 602 includes all the bytes 2 arranged in sequential words. Data portion 603 includes the bytes 1 arranged in sequential words. Data portion 604 includes all the (least significant) bytes 1 arranged in sequential words. Interleaving the data in this manner speeds the byte comparisons in the threshold search. In accordance with this invention, threshold comparisons proceed from data portion 601, to data portion 602, to data portion 603 and to data portion 604.

Figure 7:
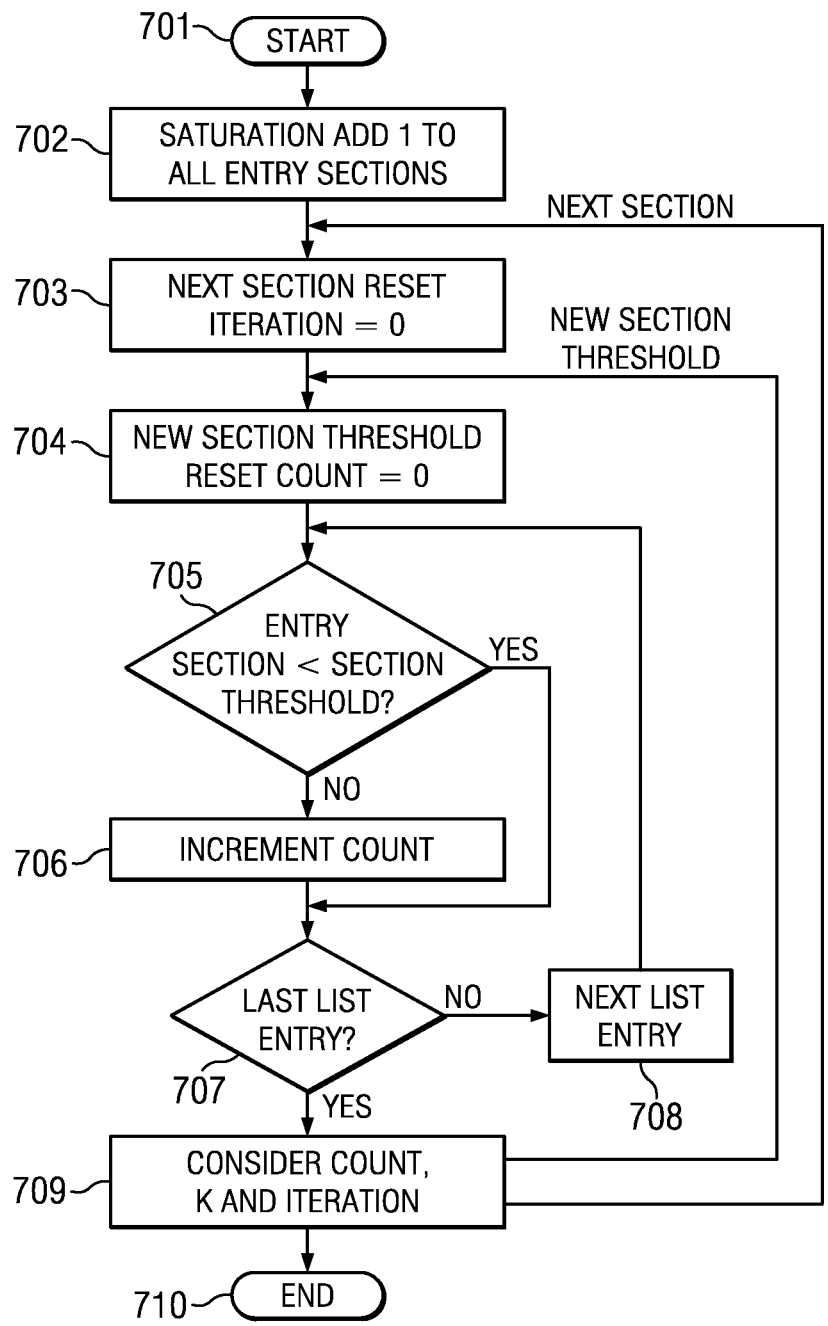
FIG. 7 is a flow chart illustrating a preferred embodiment of the threshold determinations for each section of this invention.

FIG. 7 is a flow chart illustrating an inner loop in the threshold search of this invention. This process begins at start block 701. One requirement to use the efficient SIMD packed data processing on a digital signal processors is that data is stored in physically consecutive memory locations. The data is interleaving of input data arrays to have consecutively stored list sections as illustrated in FIG. 6 prior to array processing. This preprocessing is not shown in FIG. 7, but will be explained more below. Processing block 702 adds 1 to each data entry section and saturates to the maximum of section value. This is 255 for unsigned 8-bit section value of this example. The rationale for the add and saturation will be explained below. Processing block 703 considers the next section of the list array and resets an Iteration value to 0. The variable Iteration is an outer loop variable for each section. In the case of the first iteration of this loop the next section is the most significant bit section. Processing block 704 resets an inner loop variable Count and selects a new section threshold for the section. In the case of the first iteration of this loop for each section this new section threshold is the initial section threshold. For the example case of 8-bit sections, each section can have a value between 0 and 255. In such an example the preferred initial section threshold is 127 or 128.

Decision block 705 tests to determine if the corresponding entry section is less than the section threshold. If this is false (No at decision block 705), then processing block 706 increments Count. This loop variable Count is a running count for the current section of the list of the number of list entries not less than (that is greater than or equal to) the section threshold. The goal of the threshold search is to find the greatest section threshold having at least K entries that are greater or equal in each section. Following this count increment, process flow advances to decision block 707. If the corresponding entry section is less than the section threshold (Yes at decision block 705), then process flow advances directly to decision block 707.

Decision block 707 determines if the current entry is the last entry in the list. If this is not the case (No at decision block 707), then processing block 708 selects the next list entry. Process flow advances to decision block 705 which determines if the new entry section is less than the corresponding section threshold.

Process flow remains in this loop until decision block 707 determines the current list entry is the last list entry (Yes at decision block 707). Processing block 709 considers Count, K and Iteration values of the corresponding section and provides one of three possible outcomes. If Count equals K, then the top K selection has located the desired K greatest entries in the N member list. In addition there are conditions under which an optimum Count is reached without being equal to K. In either of these cases the threshold is complete and flow chart exits at end block 710.

In a second type of exit from processing block 709, the consideration of Count, K and Iteration values of the section determines an optimum Count has not been reached. In this case the section threshold is adjusted in a manner further described below and flow advances to processing block 704. Processing block 704 resets Count and sets a new threshold for decision block 705.

In a third type exit from processing block 709, the consideration of Count, K and Iteration values of the section determines an optimum threshold had been determined for the current section. The process then considers the next section of the list entries. Flow advances to processing block 703 to consider the next section. As previously described, the preferred embodiment of this invention proceeds from the most significant bit section to the least significant bit section. Thus the next section selected by processing block 703 is the next less significant section. Thus flow proceeds from section X3 to section X2 to section X1 to section X0 in the current example illustrated in FIG. 5.

Figure 8A:
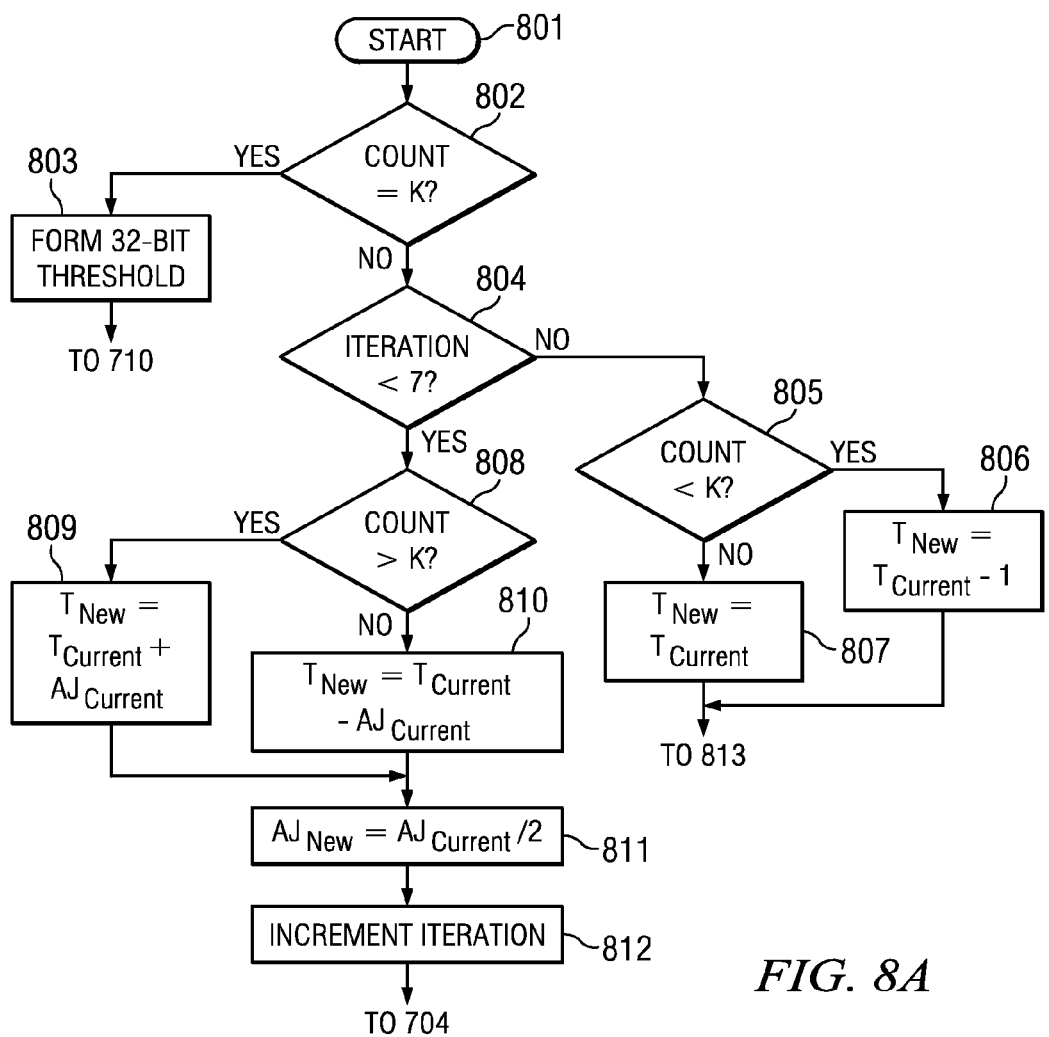
FIGS. 8A and 8B together are a flow chart illustrating the loop end of the flow chart of FIG. 7.
Figure 8B:
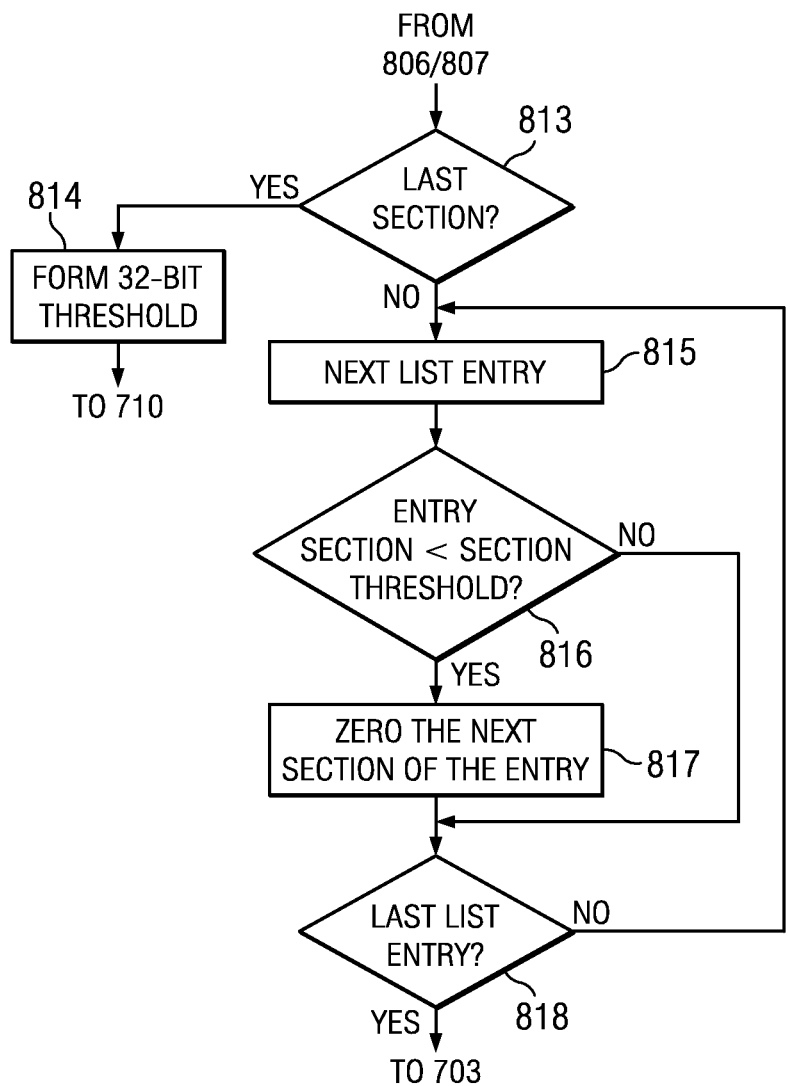

FIG. 8 illustrates a more detailed view of processing block 709 at the loop end of FIG. 7. Processing block 709 is entered via start block 801. Decision block 802 tests to determine if Count equals K. If Count equals K (Yes at decision block 802), then the current combined threshold has selected the desired K elements from the original list. Processing block 803 forms a combined 32-bit threshold by concatenating the section thresholds in significant bit order and subtracting 1 from all threshold sections. The subtraction by 1 is to offset the saturation add 1 in processing block 702. An all 0s section threshold is used for any section not considered in the threshold process before subtraction by 1. Processing flows to end block 710 of FIG. 7.

If Count does not equals K (No at decision block 802), then an appropriate combined threshold has not been found. In this event the current section threshold is not guaranteed to be ideal. Decision block 804 checks to determine if the Iteration value is less than 7. In the current example a maximum of 7 iterations is used because after 7 iterations (that is after Iteration goes from 0 to 6), the threshold adjustment factor is reduced from and initial value of 64 to 0. An Iteration value equal to 7 is a special case that will be further considered below. If Iteration is less than 7, (Yes at decision block 804), then decision block 808 tests to determine if Count is greater than K. If Count is greater than K (Yes at decision block 808), then the current section threshold should be increased to decrease Count. The preferred embodiment of this invention uses a binary search for the section threshold. Processing block 809 sets the new section threshold equal to the sum of the current section threshold and a current adjustment factor. In the preferred embodiment using four 8-bit sections of a 32-bit data word, the initial threshold is 127 or 128 and the initial adjustment factor is 64. Processing block 809 could for example set a new section threshold as 192 (128+64). Processing block 811 updates the adjustment factor by dividing by 2. Processing block 709 is exited to decision block 704 (FIG. 7) with the new section threshold.

If Count is less than K (No at decision block 808), then the current segment threshold should be decreased to increase Count. Note that decision block 802 prevents a Count equal to K at decision block 808. Processing block 810 sets the new section threshold to the difference of the current section threshold and the current adjustment. Processing block 808 could for example set a new section threshold as 64 (128−64). Processing block 811 updates the adjustment factor by dividing by 2. Processing block 709 is exited to decision block 704 with the new section threshold.

If the Iteration value reaches 7 (No at decision block 804), then no further section threshold adjustment is feasible without special handling. Decision block 805 determines if the current Count is less than K. If the current Count is less than K (Yes at decision block 805), then processing block 806 set a section threshold by subtracting 1 from the current section threshold. If the current Count is not less than K (No at decision block 805), then processing block 807 selects the section threshold to the value of current section threshold. Note that decision block 802 prevents a Count equal to K at decision block 805.

Following the selection of a section threshold, decision block 813 determines if the current section is the last section, that is the least significant section. If that is the case (Yes at decision block 813), the processing block 814 forms a combined 32-bit threshold by concatenating the section thresholds in significant bit order and subtracting 1 from all threshold sections. The subtraction by 1 is to offset the saturation add 1 in processing block 702. Processing flows to end block 710 of FIG. 7.

If the current section is not the last section (No at decision block 813), then process proceeds to the next section. A bit of processing occurs before threshold searching the next section. The entry list is searched again using the just determined section threshold. Processing block 815 selects the next list entry. For the first iteration of this loop the next list entry is the first list entry. Decision block 816 tests to determine if the corresponding entry section is less than the section threshold obtained. This comparison is similar to the comparison of decision block 705. If this is true (Yes at decision block 816), then processing block 817 sets to zero the next section of this entry. The next section set to zero is the next significant section of the entry. Setting such entries to zero eliminates from consideration in following least significant threshold detection entries already determined not to be within the K greatest in the N element list. This preserves the memory continuity of each section array illustrated in FIG. 6 for efficient packed data processing. If the corresponding entry section is not less than the obtained section threshold (No at decision block 816), then flow proceeds to decision block 818 and the entry is unchanged. Decision block 818 determines if the current entry is the last entry in the list. If the current entry is not the last entry (No at decision block 818), then flow proceeds to processing block 815 to consider the next entry in the list. If the current entry is the last entry (Yes at decision block 818), then flow proceeds block 703 in FIG. 7 to process the next section. As previously described, the preferred embodiment of this invention proceeds from the most significant bits section to the least significant bits section.

After the final combined 32-bit threshold T3T2T1T0 is found (where TX is the section threshold of the Xth section), it is compared with each 4-byte input entry of B3B2B1B0 in the selection step, to determine the final top K' candidates. The worst assumption in threshold search can lead to loose byte thresholds, hence an unnecessarily larger number of selected top candidates than K.

Figure 9:
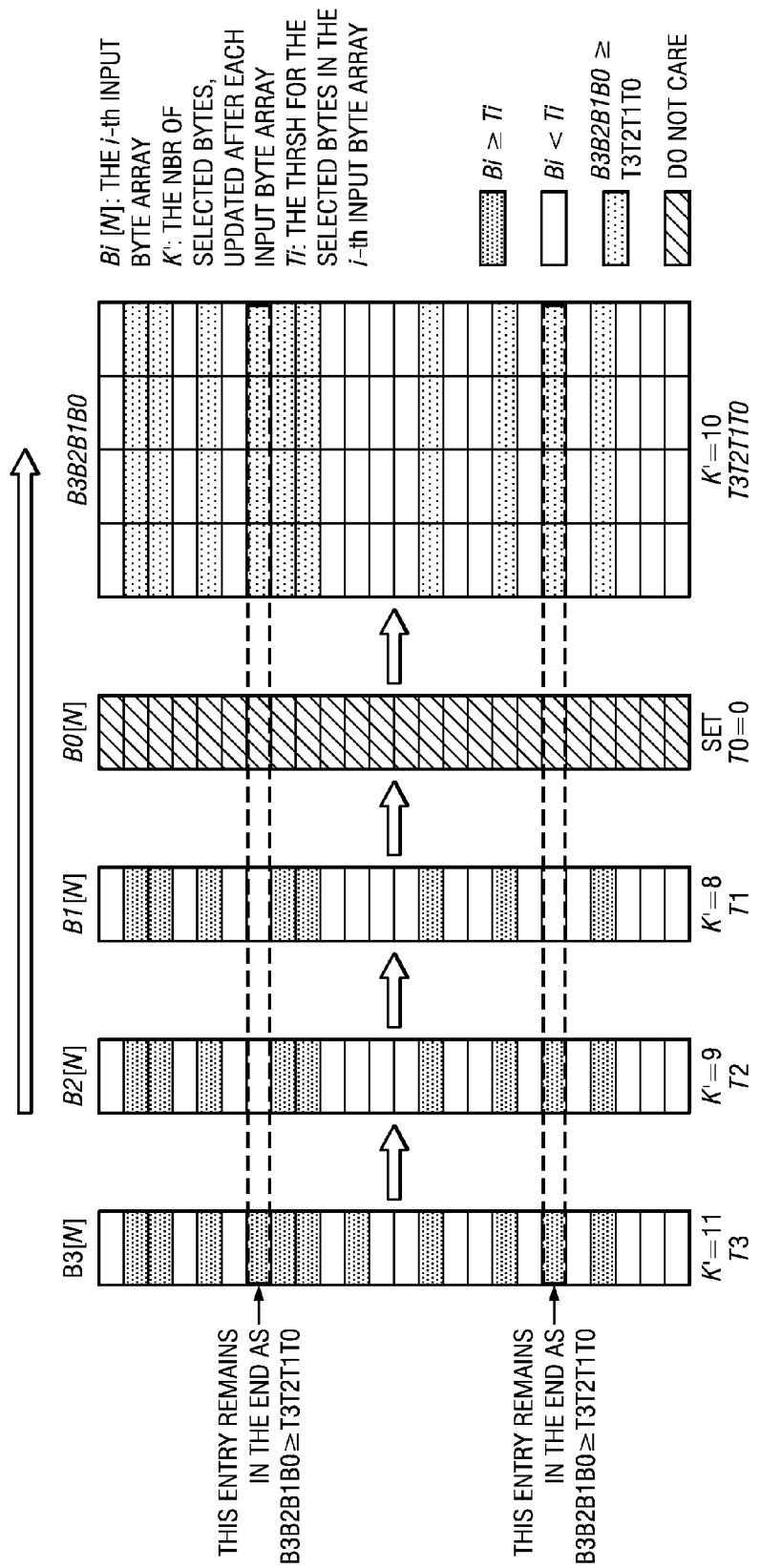
FIG. 9 illustrates an example of application of the selection algorithm of this invention.

FIG. 9 illustrates an example of application of the selection algorithm of this invention. FIG. 9 illustrates a N-element with each element having sections B3, B2, B1 and B0. In the example of FIG. 9 K is 8. The threshold determination of section B3 yields a section threshold T3 with 11 elements with B3 (dark gray elements) not less than T3. Other elements have B3 (light gray elements) less than T3. Those entries where B3<T3 (white elements) are zeroed in the less significant bytes. The threshold determination of section B2 yields a section threshold T2 with 9 elements with B2 (dark gray elements) not less than T2. Those entries where B2<T2 (white elements) are zeroed in the less significant bytes. The threshold determination of section B1 yields a section threshold T1 with 8 elements with B1 (dark gray elements) not less than T1. This is the desired number K=8. Thus section B0 is not searched. In this example section threshold T0 is set to 0 in the final threshold T3T2T1T0.

This invention makes the final selection of the K greatest entries from those identified according to the flow charts of FIGS. 7 and 8. If there are exactly K entries identified, these are the K greatest entries. Production of more than K entries according flow charts of FIGS. 7 and 8 may occur if there are at least two equal entries at the boundary of K entries. In addition as shown in the example of FIG. 9, two entries dropped in the middle of a section threshold are selected in the final selection set due to the independent section threshold search.

The algorithm works well with input entries of the same data size in any number of bytes and in any radix. When not of the same data size, short data can be zero padded in their most significant bits to reach the same length. The principle can be applied on any computing architectures which support instructional level parallelism.

The highly efficient implementation of this decoupled selection algorithm heavily depends on the instructional level parallelism of processing architecture. When implemented on KeyStone architecture of Texas Instruments, each array processing is performed with multiple parallel data reading and writing thus keeping memory accesses to a minimum. In the TI TMS320C6600 family of digital signal processors, instruction level parallelism can be achieved using packed data processing with SIMD intrinsics such as the instructions amem8 for aligned multiple memory access, dcmpgtu4 for parallel comparisons, dbitc4 for parallel counting, dxpnd4 for parallel bit expanding. These four techniques are used to attain efficient selection and correct logics.

Figure 10:
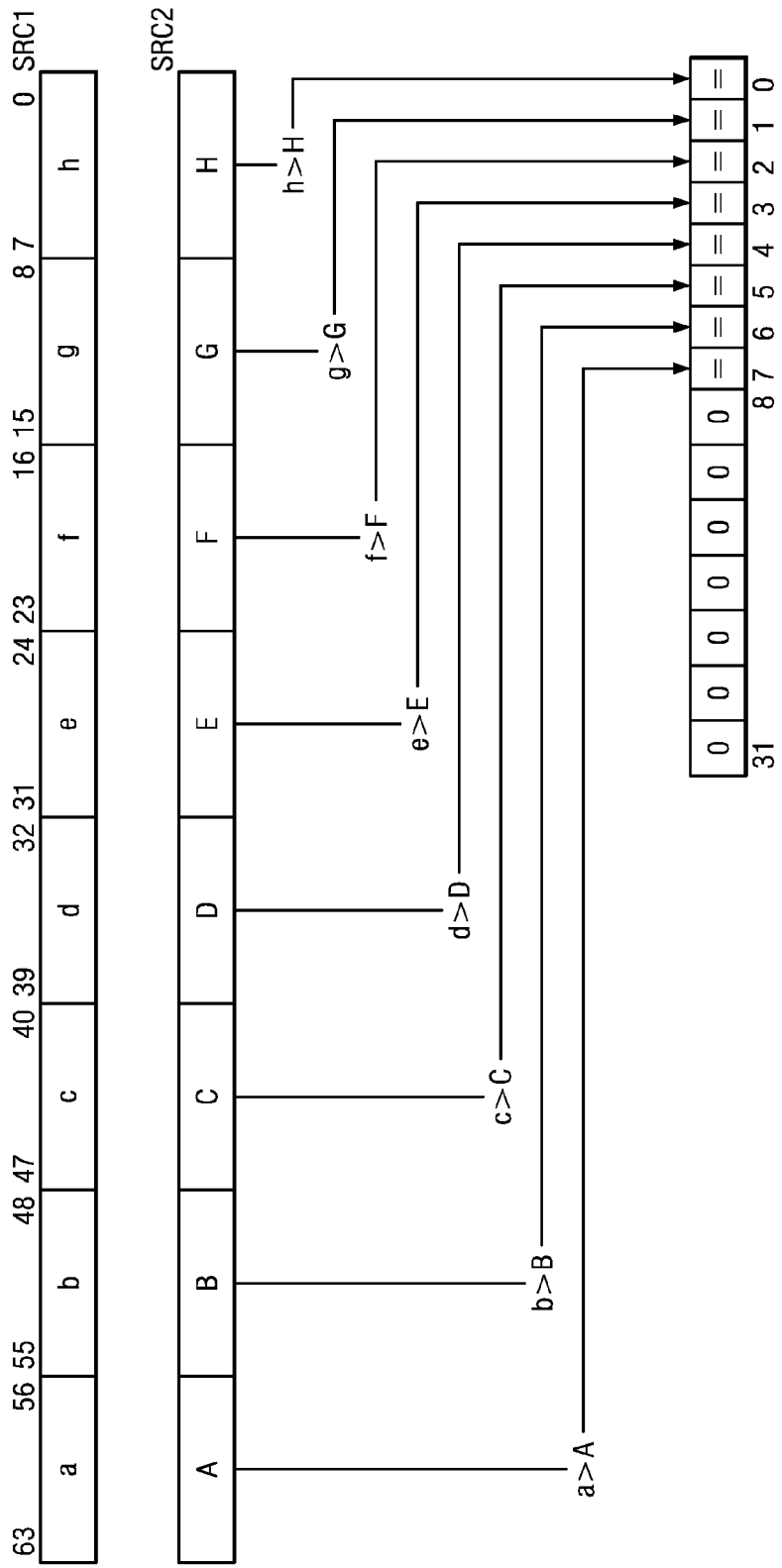
FIG. 10 illustrated the operation of a prior art multiple compare instruction used in the preferred embodiment of this invention.

FIG. 10 illustrates a known instruction supported by the TI TMS320C6600 family of digital signal processors known as dcmpgtu4. The dcmpgtu4 instruction has two double precision operands specified by scr1 and scr2. In specifying these double precision operands each field scr1 and scr2 specifies the lower even register in an even/odd register pair. The output is specified in the dst operand and is a single register. Each byte of the double word src1 is compared with a corresponding byte of the double word src2. If the byte of src1 is greater than the byte of src2, then a 1 bit is placed in a corresponding bit of the destination. Otherwise a 0 bit is placed in the corresponding bit. Thus the comparison results are packed into the 8 least significant bits of the destination. The upper significant bits of the destination are unchanged. To use this instruction for the comparison of 705, the first operand src1 includes the section threshold in each byte section. The second operand src2 is packed with 8 corresponding sections of 8 entries in the list. This packed data structure is illustrated in FIG. 6. The destination register can be left shifted 8 bits opening up 8 new least significant bits for another comparison. This can be repeated until the destination register is full (4 comparisons of 8 sections is 32 comparisons). If the length of the list is greater than 32 elements this can be repeated with a different destination register.

When all comparisons are made a bit count instruction can be applied to each of these comparison destination registers. Each such bit count instruction counts the number of is in the register. If more than one destination register was needed these counts can be added using an ordinary ADD instruction to determine the Count for this section of the list.

Figure 11:
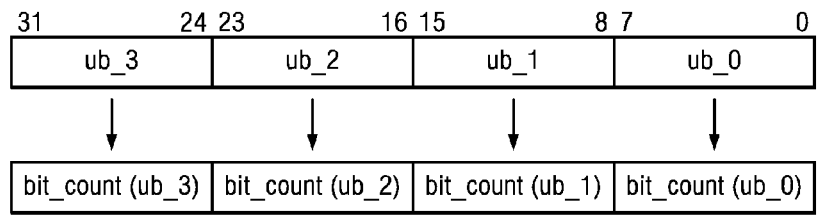
FIG. 11 illustrated the operation of a prior art four section bit count instruction used in the preferred embodiment of this invention.
Figure 12:
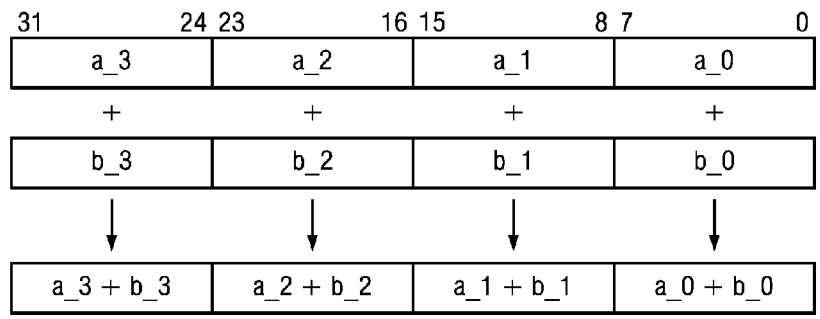
FIG. 12 illustrated the operation of a prior art multiple section addition instruction used in the preferred embodiment of this invention.

Not all instruction set architectures support a 32-bit bit count instruction. FIG. 11 illustrates an example of a prior art instruction bit count instruction supported by the TI TMS320C6600 family of digital signal processors. This bitc4 instruction forms separate bits on each byte in a source register. The total bit count of the source register is the sum of the byte bit counts. A practical embodiment performs such a bitc4 instruction on each of the combined comparison results of the dcmpgtu4 instruction (FIG. 10). This results in a plurality of packed data words each having the bit counts of corresponding sections of the combined comparison results. An add4 instruction (illustrated in FIG. 12) separately adds corresponding bytes of two source registers and places the results in corresponding bytes of the destination register. Up to 32 registers of such packed bit comparisons can be added if ignore the case of all is in 256 comparisons. These separate byte sums can be added using various pack, shift and add instructions to form the final count.

Figure 13:
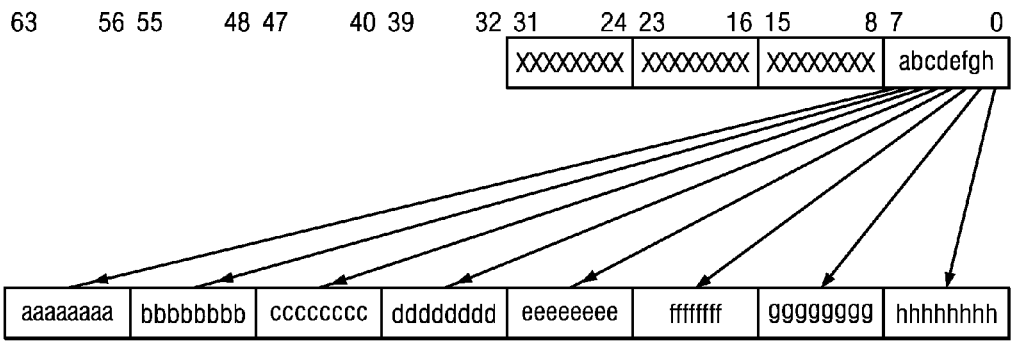
FIG. 13 illustrated the operation of a prior art mask generation instruction used in the preferred embodiment of this invention.

After each byte array processing except for the least significant byte array, a zeroing-out is performed on the immediately next byte array to set to zero the bytes with their immediately previous bytes below the byte threshold found at that array. This preserves only the entries passing the previous byte threshold search in the next section threshold search. To avoid the expensive individual key or index extraction of selection, this zeroing-out is based on the packed masking of selection comparisons with the threshold found. FIG. 13 illustrates and example of a prior art mask formation instruction dxpnd4 supported by the TI TMS320C6600 family of digital signal processors. In the dxpand4 instruction each of the 8 least significant bits of a source register sets all bits in a corresponding byte of a double word destination. Note that the dst field of the instruction determines the even register number of the destination double word and the higher odd register number is implied. Following the comparison of decision block 816 via a dcmpgtu4 instruction, the algorithm produces a mask using a dxpand4 instruction from the comparison results. This mask is ANDed with the data of the corresponding next data portion illustrated in FIG. 6. The not less than results are unchanged, preserving this data for the threshold determination of the following section. The less than results are zeroed, preventing less significant bits of these original list entries for taking part the threshold determination of the following section. With packed data processing, expensive individual memory access are thus avoided.

There is a problem with the zeroing out above when the byte threshold is found to be zero on any middle byte array. In this case, no pre-selection is achieved by zeroing out next bytes and all get selected. Essentially, any prior selection through all prior byte threshold searches is lost after this byte array. To solve the problem, a 1 is added to all the middle data bytes (thus excluding the most and the least significant bytes) with saturation at 255 (the maximum of radix-8 value) in processing block 702. With this change a zero byte threshold never occurs over a middle byte array. The saturation add by 1 is also performed through packed data processing by using SIMD intrinsics such as saddu4 for a TI TMS320C6600 family digital signal processor. At the end of threshold search step, the complete threshold is adjusted by subtracting 1 from all middle bytes.

In the byte threshold search step, each threshold is initialized to a value close to the median of a byte and a threshold adjustment value is initialized to a value close to the quarter of the radix. For unsigned byte values, this can be either 127 or 128 for the initial threshold and 64 for the initial adjustment. In each threshold search iteration, the adjustment is reduced by half. This covers the entire range of a radix when the adjustment reaches 1. For unsigned byte values of this example, the adjustment reaches 1 after 7 iterations. At this point the entire range of an unsigned byte is not completely covered for both 127 and 128 starting threshold, which are confined to the inclusive intervals of [1, 253] and [2, 254], respectively. To fix this problem, one more search iteration is performed outside of the main iteration loop with an adjustment value of 1 as triggered by decision block 804. After this iteration the range covered becomes [0, 254] and [1, 255], respectively. For complete coverage of a range [0, 255], either a saturate-to-255 add of 1 or a satuate-to-0 subtract of 1 is needed on all bytes. Considering a saturation add-1 is already implemented on middle bytes to prevent zero threshold on those bytes, this invention preferably adopts a saturate-to-255 add of 1 on all bytes for an initial threshold of 128, along with a greater-than-or-equal-to (≥) based packed byte comparisons in the threshold search process. This enabled search coverage of the entire range of byte input in [0, 255]. At the end of threshold search step, the 32-bit final threshold is adjusted by subtracting off 1 on all bytes.

An existing problem with saturation add-1 is that values 254 and 255 are irresolvable in a byte array, with all being treated as 254. This poses a problem when most of values in a byte array are 254 and 255, in this case, the selection can be much larger than K when N is also much greater than K. This chance is high only when all the byte arrays fall in such case, which has a very low probability in real systems.

Tables 2 and 3 are the cycle counts and K' values collected for 32-bit unsigned data over a simulator. The test vectors are full 32-bit scheduling metrics based on user data collected from comprehensive LTE (Long Term Evolution) wireless uplink system simulations with multiple cells. Each cell has the minimum, mean and maximum values in the format minimum-mean-maximum.

TABLE 2

| N (K out of N) | selectindex_32 bit (The algorithm returns K' ≥ K top candidates) | | | | |
|---|---|---|---|---|---|
| | K = 4 | K = 8 | K = 12 | K = 16 | K = 20 |
| 32 | 189-362-1136 | 189-397-1136 | 189-422-1136 | 189-444-1136 | 217-450-1136 |
| 64 | 241-460-1248 | 241-492-1248 | 241-518-1248 | 241-534-1249 | 241-552-1249 |
| 128 | 361-625-1515 | 361-668-1516 | 361-704-1516 | 361-733-1515 | 361-734-1515 |
| 256 | 601-966-2067 | 601-1030-2068 | 601-1066-2068 | 601-1099-2068 | 601-1133-2068 |
| 512 | 1081-1664-3171 | 1081-1723-3171 | 1081-1793-3171 | 1081-1852-3171 | 1081-1878-3172 |

TABLE 3

| N (K out of N) | selectindex_32 bit (The algorithm returns K' ≥ K top candidates) | | | | |
|---|---|---|---|---|---|
| | K = 4 | K = 8 | K = 12 | K = 16 | K = 20 |
| 32 | 4-4.25-10 | 8-8.45-18 | 12-12.65-26 | 16-16.81-25 | 20-20.70-29 |
| 64 | 4-4.37-14 | 8-8.58-18 | 12-12.76-22 | 16-16.84-30 | 20-20.94-36 |
| 128 | 4-4.41-13 | 8-8.75-24 | 12-13.02-26 | 16-17.20-28 | 20-21.28-32 |
| 256 | 4-4.49-17 | 8-8.88-18 | 12-13.21-28 | 16-17.50-34 | 20-21.77-38 |
| 512 | 4-4.63-18 | 8-8.99-35 | 12-13.55-44 | 16-17.89-45 | 20-22.29-45 |

This application has described finding the K greatest entries from an N element list. Those skilled in the art would realize that the separate section comparison technique of this invention could equally well be applied to finding the K least entries by proper selection of the comparisons.

What is claimed is:

1. A computer implemented method of selecting K greatest elements of a list of N elements comprising the steps of:
   partitioning each of the N elements into a plurality of sections;
   for each section of the N elements from a most significant section to a least significant section iteratively
      comparing a corresponding section of each of the N elements to a section threshold,
      counting a number of sections of the N elements which are not less than the section threshold,
      increasing the section threshold if the count of sections of the N elements is not less than the section threshold is greater than K,
      decreasing the section threshold if the count of sections of the N elements is not less than the section threshold is less than K,
      until a section threshold having at least K elements not less than said section threshold is determined for the corresponding section;
   forming a combined threshold by concatenation of said section thresholds in order from a most significant section to a least significant section;
   comparing each of the N elements to the combined threshold; and
   selecting K elements from the set of N elements not less than the combined threshold.

2. The computer implemented method of claim 1, wherein said step of iteratively for each section of the N elements from a most significant section to a least significant section further includes:
   setting an initial section threshold to a number one half of a maximum number expressible by the number of bits of the corresponding section.

3. The computer implemented method of claim 2, wherein:
   said step of iteratively for each section of the N elements from a most significant section to a least significant section wherein:
      said step of increasing the section threshold increases the section threshold by adding an adjustment factor to a prior section threshold and setting a next adjustment factor to half a current adjustment factor, an initial adjustment equal to half the initial section threshold; and
      said step of decreasing the section threshold decreases the section threshold by subtracting an adjustment factor from a prior section threshold and setting a next adjustment factor to half a current adjustment factor.

4. The computer implemented method of claim 1, wherein:
   the computer implements a multiple compare instruction operable to compare plural sections of two source data registers and pack a result of each section comparison in a corresponding bit of a destination data register; and
   said step of comparing a corresponding section of each of the N elements to a section threshold includes
      packing corresponding sections of list entries into plural data words, and
      performing the multiple compare instruction on one of the plural packed data words as first data register and a second data register having the corresponding section threshold repeated in each corresponding section; and
   said step of counting a number of sections of the N elements which are not less than the section threshold includes counting bits within at least one destination register of the multiple compare instruction.

5. The computer implemented method of claim 4, wherein:
   said step of performing the multiple compare instruction on one of the plural packed data words produces a single bit result for each said comparison which is stored in a destination data register;
   the method further comprising
      shifting the destination data register following each multiple compare instruction to present a set of bits equal to a number of sections of the multiple compare instruction for a subsequent multiple compare instruction until the destination data register is full of the single bit results, and thereafter selecting a new destination data register.

6. The computer implemented method of claim 4, wherein:
the computer implements a bit count instruction by counting a number of bits having a 1 state in a source register and storing this count in a destination register; and
said step of counting a number of sections of the N elements includes performing said bit count instruction on each destination register of a multiple compare instruction.

7. The computer implemented method of claim 4, wherein:
the computer implements a multiple addition instruction by adding corresponding sections of two source data registers and storing a sum in a corresponding section of a destination register;
the computer implements a section bit count instruction by counting a number of bits having a 1 state in each section of a source register and storing this count in a corresponding section of a destination register; and
said step of counting a number of sections of the N elements includes
performing said bit count instruction on each destination register of a multiple compare instruction,
performing said multiple addition instruction of each destination register of each section bit count instruction destination register, and
adding counts of each section of a destination register of a final multiple addition instruction.

8. The computer implemented method of claim 4, wherein:
for each section of the N elements following determination of said section threshold having at least K elements not less than said section threshold setting to zero a next less significant section of elements not said at least K elements.

9. The computer implemented method of claim 4, wherein:
said computer implements a mask instruction by copying each of a predetermined number of bits of a source data register into a corresponding section of a destination register, repeating said source register bit to fill said destination register section;
said step of setting to zero a next less significant section of elements not said at least K elements includes
performing a multiple compare instruction for each section with said section threshold;
performing a mask instruction upon each destination register of the multiple compare instruction;
ANDing the destination register of the mask instruction with each packing corresponding sections of list entries and storing results to replace the packing corresponding sections of list entries.

10. The computer implemented method of claim 1, wherein:
each entry consists of 32 bits; and
each section of each entry consists of 8 bits.

11. The computer implemented method of claim 1, wherein:
said step of iteratively for each section of the N elements from a most significant section to a least significant section further includes setting a maximum number of iterations for section threshold adjustment to the largest integer not greater than the base-2 logarithm of M, where M is the maximum number expressible by the number of bits of the corresponding section.

12. The computer implemented method of claim 4, wherein:
said step of comparing a corresponding section of each of the N elements to a section threshold further includes
following said packing step and before performing said multiple compare instruction
adding 1 to each section of the N elements through a multiple saturation-add instruction which saturates to a maximum number expressible by the number of bits of the corresponding section.

13. The computer implemented method of claim 12, wherein:
said step of forming a combined threshold further includes
following said concatenation step
subtracting 1 from each section of said concatenation of said section thresholds through a multiple subtraction instruction.

14. A computer implemented method of selecting K least elements of a list of N elements comprising the steps of:
partitioning each of the N elements into a plurality of sections;
for each section of the N elements from a most significant section to a least significant section iteratively
comparing a corresponding section of each of the N elements to a section threshold,
counting a number of sections of the N elements which are not greater than the section threshold,
decreasing the section threshold if the count of sections of the N elements is not greater than the section threshold is greater than K,
increasing the section threshold if the count of sections of the N elements is not greater than the section threshold is less than K,
until a section threshold having at least K elements not greater than said section threshold is determined for the corresponding section;
forming a combined threshold by concatenation of said section thresholds in order from a most significant section to a least significant section;
comparing each of the N elements to the combined threshold; and
selecting K elements from the set of N elements not greater than the combined threshold.

15. The computer implemented method of claim 14, wherein:
said step of iteratively for each section of the N elements from a most significant section to a least significant section further includes setting an initial section threshold to a number one half of a maximum number expressible by the number of bits of the corresponding section.

16. The computer implemented method of claim 15, wherein:
said step of iteratively for each section of the N elements from a most significant section to a least significant section wherein:
said step of increasing the section threshold increases the section threshold by adding an adjustment factor to a prior section threshold and setting a next adjustment factor to half a current adjustment factor, an initial adjustment equal to half the initial section threshold; and
said step of decreasing the section threshold decreases the section threshold by subtracting an adjustment factor from a prior section threshold and setting a next adjustment factor to half a current adjustment factor.

17. The computer implemented method of claim 14, wherein:
the computer implements a multiple compare instruction operable to compare plural sections of two source data registers and pack a result of each section comparison in a corresponding bit of a destination data register; and said step of comparing a corresponding section of each of
the N elements to a section threshold includes
packing corresponding sections of list entries into plural
data words, and
performing the multiple compare instruction on one of
the plural packed data words as first data register and
a second data register having the corresponding section threshold repeated in each corresponding section; and
said step of counting a number of sections of the N elements which are not greater than the section threshold
includes counting bits within at least one destination
register of the multiple compare instruction.

18. The computer implemented method of claim 17, wherein:
said step of performing the multiple compare instruction
on one of the plural packed data words produces a single
bit result for each said comparison which is stored in a
destination data register;
the method further comprising
shifting the destination data register following each multiple compare instruction to present a set of bits equal
to a number of sections of the multiple compare
instruction for a subsequent multiple compare
instruction until the destination data register is full of
the single bit results, and
thereafter selecting a new destination data register.

19. The computer implemented method of claim 17, wherein:
the computer implements a bit count instruction by counting a number of bits having a 1 state in a source register
and storing this count in a destination register; and
said step of counting a number of sections of the N elements includes performing said bit count instruction on
each destination register of a multiple compare instruction.

20. The computer implemented method of claim 17, wherein:
the computer implements a multiple addition instruction
by adding corresponding sections of two source data
registers and storing a sum in a corresponding section of
a destination register;
the computer implements a section bit count instruction by
counting a number of bits having a 1 state in each section
of a source register and storing this count in a corresponding section of a destination register; and
said step of counting a number of sections of the N elements includes
performing said bit count instruction on each destination
register of a multiple compare instruction,
performing said multiple addition instruction of each
destination register of each section bit count instruction destination register, and
adding counts of each section of a destination register of
a final multiple addition instruction.

21. The computer implemented method of claim 17, wherein:
for each section of the N elements following determination
of said section threshold having at least K elements not
greater than said section threshold setting to zero a next
less significant section of elements not said at least K
elements.

22. The computer implemented method of claim 21, wherein:
said computer implements a mask instruction by copying
each of a predetermined number of bits of a source data
register into a corresponding section of a destination
register, repeating said source register bit to fill said
destination register section;
said step of setting to zero a next less significant section of
elements not said at least K elements includes
performing a multiple compare instruction for each section with said section threshold;
performing a mask instruction upon each destination
register of the multiple compare instruction;
ANDing the destination register of the mask instruction
with each packing corresponding sections of list
entries and storing results to replace the packing corresponding sections of list entries.

23. The computer implemented method of claim 17, wherein:
said step of comparing a corresponding section of each of
the N elements to a section threshold further includes
following said packing step and before performing said
multiple compare instruction
subtracting 1 from each section of the N elements
through a multiple saturation-subtract instruction
which saturates to a minimum number expressible by
the number of bits of the corresponding section.

24. The computer implemented method of claim 23, wherein:
said step of forming a combined threshold further includes
following said concatenation step
adding 1 to each section of said concatenation of said
section thresholds through a multiple addition
instruction.

25. The computer implemented method of claim 14, wherein:
each entry consists of 32 bits; and
each section of each entry consists of 8 bits.

26. The computer implemented method of claim 14, wherein:
said step of iteratively for each section of the N elements
from a most significant section to a least significant
section further includes setting a maximum number of
iterations for section threshold adjustment to the largest
integer not greater than the base-2 logarithm of M,
where M is the maximum number expressible by the
number of bits of the corresponding section.

* * * * *